(12) United States Patent
Sakai et al.

(10) Patent No.: US 11,396,921 B2
(45) Date of Patent: Jul. 26, 2022

(54) WAVE SPRING

(71) Applicant: NHK SPRING Co., Ltd., Yokohama (JP)

(72) Inventors: Hideaki Sakai, Yokohama (JP); Atsushi Yoneoka, Yokohama (JP)

(73) Assignee: NHK SPRING CO., LTD., Yokohama (JP)

( * ) Notice: Subject to any disclaimer, the term of this patent is extended or adjusted under 35 U.S.C. 154(b) by 0 days.

(21) Appl. No.: 16/967,252

(22) PCT Filed: Feb. 22, 2019

(86) PCT No.: PCT/JP2019/006821
§ 371 (c)(1),
(2) Date: Aug. 4, 2020

(87) PCT Pub. No.: WO2019/163953
PCT Pub. Date: Aug. 29, 2019

(65) Prior Publication Data
US 2021/0003185 A1 Jan. 7, 2021

(30) Foreign Application Priority Data
Feb. 26, 2018 (JP) .............................. JP2018-032465

(51) Int. Cl.
*F16F 1/32* (2006.01)
*F16F 1/02* (2006.01)

(52) U.S. Cl.
CPC .............. *F16F 1/328* (2013.01); *F16F 1/025* (2013.01); *F16F 2226/048* (2013.01); *F16F 2238/022* (2013.01)

(58) Field of Classification Search
CPC ...... F16F 1/025; F16F 1/328; F16F 2226/048; F16F 2238/022
See application file for complete search history.

(56) References Cited

U.S. PATENT DOCUMENTS 8,876,094 B1 * 11/2014 Ridgeway ................. F16F 1/34
267/161
9,091,315 B2 7/2015 Doetterl
2005/0093216 A1 * 5/2005 Kobelev ................. F16F 1/328
267/161
(Continued)

FOREIGN PATENT DOCUMENTS

FR 2398227 A * 3/1979
JP S5058155 A 5/1975
(Continued)

OTHER PUBLICATIONS

FR2398227 English abstract (Year: 1979).*
(Continued)

*Primary Examiner* — Melody M Burch
(74) *Attorney, Agent, or Firm* — Cantor Colburn LLP

(57) ABSTRACT

A wave spring includes an annular body in which crests and valleys are alternately and continuously formed in a circumferential direction. At least a portion of the annular body in the circumferential direction is a joined portion. The joined portion of the annular body is a flat portion extending in a plane orthogonal to a center axis of the annular body.

7 Claims, 3 Drawing Sheets

(56) References Cited

U.S. PATENT DOCUMENTS

| | | | | |
|---|---|---|---|---|
| 2007/0183867 A1* | 8/2007 | Hesselmann | ........... | F16F 1/328 |
| | | | | 411/544 |
| 2008/0060905 A1* | 3/2008 | Snadden | ................ | F16B 43/00 |
| | | | | 192/213.2 |
| 2012/0128490 A1* | 5/2012 | Boston | ................. | F16C 25/083 |
| | | | | 416/135 |
| 2015/0042025 A1* | 2/2015 | Terada | .................... | F16F 1/328 |
| | | | | 267/161 |
| 2015/0362036 A1 | 12/2015 | Marvuglio et al. | | |

FOREIGN PATENT DOCUMENTS

| | | |
|---|---|---|
| JP | S63-018615 U | 2/1988 |
| JP | 2005248983 A | 9/1995 |
| JP | H07248035 A | 9/1995 |
| KR | 20090075344 A | 7/2009 |

OTHER PUBLICATIONS

KIPO Notice of Grounds for Rejection for corresponding KR Application No. 10-2020-7023751; dated Oct. 15, 2020.
International Search Report for International Application No. PCT/JP2019/006821; dated Apr. 2, 2019.

* cited by examiner

WAVE SPRING

CROSS REFERENCE TO RELATED APPLICATIONS

This is the U.S. national stage of application No. PCT/JP2019/006821, filed on Feb. 22, 2019. Priority under 35 U.S.C. §119(a) and 35 U.S.C. §365(b) is claimed from Japanese Application No. 2018-032465, filed Feb. 26, 2018, the disclosure of which is also incorporated herein by reference.

TECHNICAL FIELD

The present invention relates to a wave spring.
Priority is claimed on Japanese Patent Application No. 2018-032465, filed on Feb. 26, 2018, the content of which is incorporated herein by reference.

BACKGROUND ART

Patent Document 1 discloses a wave spring including an annular body in which crests and valleys are alternately and continuously formed in a circumferential direction. In the wave spring, the annular body is formed by joining both ends of a C-shaped spring material to each other.

As a manufacturing method of such a wave spring, a method is also considered in which the annular body is formed by joining the spring material by welding or the like, and then the annular body is plastically deformed to form the crests and valleys. However, in a case where the wave spring is manufactured in such an order, a large load is applied to a joined portion when the annular body is plastically deformed. Therefore, a method is generally used in which a C-shaped spring material is formed in a corrugated shape in advance and both ends thereof are joined to each other.

DOCUMENT OF RELATED ART

Patent Document

[Patent Document 1] U.S. Pat. No. 9,091,315

DISCLOSURE OF INVENTION

Technical Problem

In the wave spring disclosed in Patent Document 1, end surfaces of the annular body inclined with respect to a center axis of the annular body are joined to each other. Therefore, a relative position of the end surfaces is hard to be determined, and the shape of the annular body after joining is likely to be unstable.

Also, in a case where welding is used as joining means, it is preferable to arrange a heat input surface (a surface of the wave spring) of the joined portion so as to be parallel to a plane orthogonal to the center axis of the annular body in order to perform welding accurately. However, in the wave spring disclosed in Patent Document 1, the heat input surface is inclined with respect to a plane orthogonal to the center axis of the annular body. Therefore, in a case of using a general-purpose welding machine with a heat input direction parallel to the center axis of the annular body, the heat input direction is not orthogonal to the heat input surface, and thus it is not easy to accurately input heat.

The present invention is made in view of the above-described circumstances, and an object thereof is to provide a wave spring that end surfaces of the annular body are more accurately joined to each other with a general-purpose welding machine.

Solution to Problem

In order to solve the above problem, there is provided a wave spring according to an aspect of the present invention including an annular body in which crests and valleys are alternately and continuously formed in a circumferential direction, in which at least a portion of the annular body in the circumferential direction is a joined portion, and the joined portion of the annular body is a flat portion extending in a plane orthogonal to a center axis of the annular body.

In the wave spring according to the aspect, the end surfaces of the annular body are joined to each other at the flat portion extending in the plane orthogonal to the center axis of the annular body. Therefore, in a case where both ends of a C-shaped spring material are joined to each other, for example, when the tops of a plurality of valleys are brought into contact with an upper surface of the worktable, both ends of the spring material are in a posture parallel to the upper surface. Accordingly, a relative position of both ends of the spring material can be easily stabilized. Furthermore, for example, in a case where laser welding is used as joining means, when the laser light is radiated in a direction perpendicular to the upper surface of the welding worktable, the laser light is radiated naturally perpendicular to an irradiated surface (a surface of the flat portion). As described above, according to the aspect, it is possible to provide a wave spring that is more accurately welded with a general-purpose welding machine.

Further, both ends of the flat portion in the circumferential direction may be formed in curved surface shapes protruding in an axial direction of the center axis.

In this case, in a case where the annular body is elastically deformed, a large stress is suppressed from locally acting on both ends of the flat portion.

Further, the flat portion may be positioned between the crests and the valleys in an axial direction along the center axis.

In this case, in a case where the annular body is pressed by a biasing target and compressed in the axial direction, the joined portion is less likely to come into contact with the biasing target. Accordingly, it is possible to suppress the joined portion from being strongly pressed by the biasing target and to suppress the failure of the joined portion.

Further, the flat portion may be positioned at a central portion of the annular body in the axial direction.

In this case, in a case where the annular body is pressed by the biasing target and compressed in the axial direction, the joined portion is less likely to come into contact with the biasing target. Therefore, it is possible to more surely suppress the failure of the joined portion.

Further, pitches at which the crests and the valleys are arranged in the circumferential direction may be non-fixed.

In this case, it is possible to apply a biasing force to the biasing target in a well-balanced manner by, for example, setting a pitch of a portion in the annular body which is positioned near the flat portion to be smaller than a pitch of a portion positioned far from the flat portion.

Further, two crests of the crests or two valleys of the valleys may be continuous to both ends of the flat portion in the circumferential direction.

Alternatively, a crest, the flat portion, and a valley may be continuous in this order in the circumferential direction.

Advantageous Effects of Invention

According to the aspect of the present invention, it is possible to provide wave spring that end surfaces of the annular body are more accurately joined to each other with a general-purpose welding machine.

BEST MODE FOR CARRYING OUT THE INVENTION

First Embodiment

Figure 1:
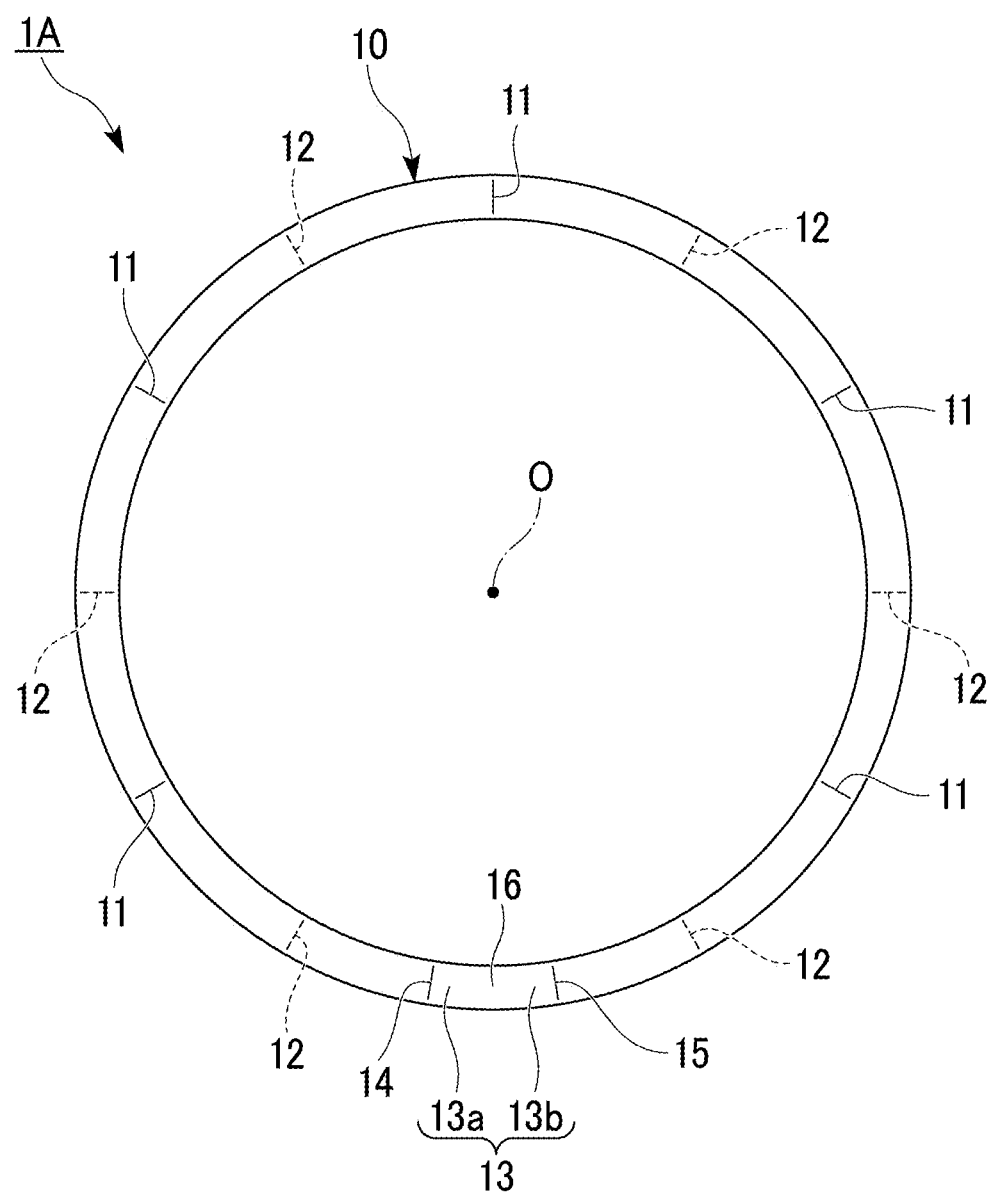
FIG. 1 is a plan view of a wave spring according to a first embodiment.

Hereinafter, a wave spring 1A according to the present embodiment will be described with reference to FIGS. 1 and 2.

The wave spring 1A includes an annular body 10. Hereinafter, a direction along a center axis of the annular body 10 is referred to as an axial direction. In a plan view viewed from the axial direction, a direction circling around the center axis O is referred to as a circumferential direction and a direction intersecting the center axis O is referred to as a radial direction. Hereinafter, one side in the axial direction is referred to as a +Z side and the other side in the axial direction is referred to as a −Z side.

In the annular body 10, crests 11 protruding toward the +Z side and valleys 12 protruding toward the −Z side are alternately and continuously formed in the circumferential direction. At least a portion of the annular body 10 in the circumferential direction is a joined portion 16. The annular body 10 includes a plurality of crests 11 and a plurality of valleys 12. The numbers of the crests 11 and the valleys 12 included in the annular body 10 may be appropriately changed.

The annular body 10 according to the present embodiment includes a flat portion 13 extending in a plane orthogonal to the center axis O. In addition, a joined portion 16 is formed at the central portion of the flat portion 13 in the circumferential direction.

Figure 2:
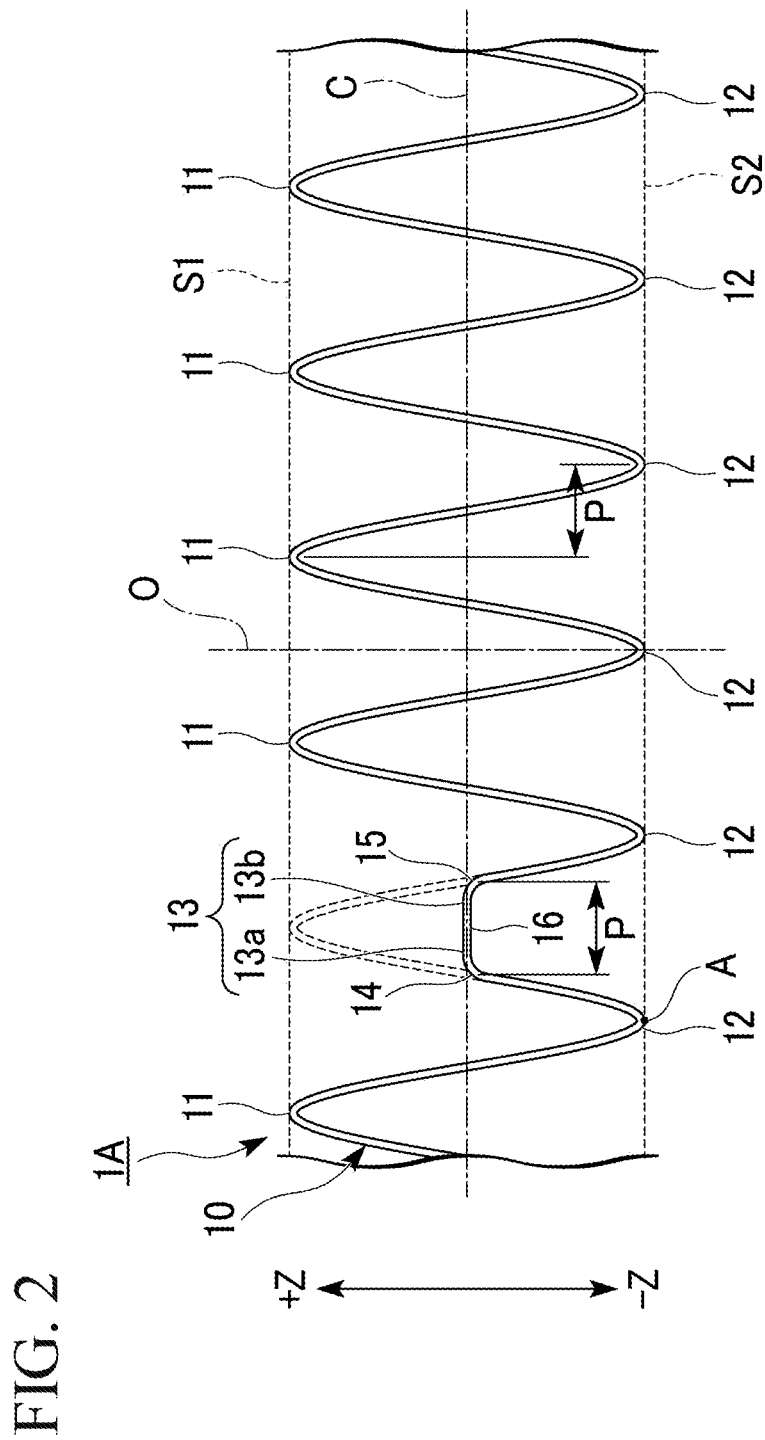
FIG. 2 is an expanded schematic view of the wave spring of FIG. 1.

FIG. 2 is an expanded schematic view of the wave spring 1A of FIG. 1. As shown in FIG. 2, two valleys of the valleys 12 are continuous to both ends of the flat portion 13 in the circumferential direction. Two crests of the crests 11 may be continuous to both ends of the flat portion 13 in the circumferential direction.

In the present embodiment, an interval (hereinafter, referred to as a pitch P) in the circumferential direction between the crests 11 and the valleys 12 which are adjacent to each other in the circumferential direction is fixed throughout the annular body 10. A length of the flat portion 13 in the circumferential direction is substantially equal to a length of the pitch P. Therefore, the wave spring 1A according to the present embodiment has a shape in which one crest (a broken line portion in FIG. 2), in a case where the crests 11 and the valleys 12 are arranged at the same pitch without forming the flat portion 13, is replaced with the flat portion 13.

As shown in FIG. 2, a plane C on which the flat portion 13 extends is substantially parallel to a plane S1 formed by connecting tops of the crests 11. The plane C is substantially parallel to the plane S2 formed by connecting the tops of the valleys 12. The flat portion 13 is positioned at a central portion of the annular body 10 in the axial direction, and the plane C is positioned middle between the plane S1 and the plane S2.

Both ends of the flat portion 13 in the circumferential direction are connected to a pair of valleys 12. Both ends of the flat portion 13 are referred to as a first connection portion 14 and a second connection portion 15. The first connection portion 14 and the second connection portion 15 are formed in a curved surface shape protruding toward the +Z side.

The wave spring 1A is formed, for example, by the following process. Hereinafter, a case where laser welding is used as joining means is exemplified, but other joining means may be adopted. For example, welding means other than laser welding, such as electron beam welding, light beam welding, arc welding, and flash butt welding, and brazing may be used as joining means.

First, a belt-shaped spring material is processed into C-shaped having a plurality of crests 11 and a plurality of valleys 12. At this time, a first end 13a and a second end 13b of the spring material are formed in a flat shape.

Next, each top of the crests 11 or each top of the valleys 12 is brought into contact with a welding worktable of a welding machine (a laser device). At this time, the first end 13a and the second end 13b of the spring material are in a posture parallel to the upper surface of the welding worktable.

Then, in a state where the end surfaces of the first end 13a and the second end 13b are in contact with or close to each other, laser light is radiated toward the end surfaces in a direction perpendicular to the upper surface of the welding worktable. Accordingly, the first end 13a and the second end 13b are welded to each other. Thus, the first end 13a and the second end 13b are integrated to form the flat portion 13, and the joined portion 16 is formed at the central portion of the flat portion 13 in the circumferential direction.

Thus, in the wave spring 1A of the present embodiment, end surfaces of the annular body 10 are joined to each other at the flat portion 13 extending in a plane orthogonal to the center axis O of the annular body 10. Therefore, in a case of joining the first end 13a and the second end 13b to each other, both ends 13a and 13b can be in a posture parallel to the upper surface of the worktable. Accordingly, a relative position of both ends 13a and 13b can be easily stabilized. In a case where laser welding is used as joining means, when the laser light is radiated in a direction perpendicular to the upper surface of the welding worktable, the laser light is radiated naturally perpendicular to the surface of both ends 13a and 13b facing the axial direction. In a word, the surfaces of both ends 13a and 13b which are the irradiated surfaces irradiated with the laser light are perpendicular to an optical axial direction of the laser light. As described above, according to the present embodiment, it is possible to provide wave spring 1A that end surfaces of the annular body are more accurately joined to each other with a general-purpose welding machine.

Further, the connection portions 14 and 15 which are both ends of the flat portion 13 in the circumferential direction are formed in a curved surface shape protruding in the axial direction. Thereby, in a case where the annular body 10 is elastically deformed, a large stress is suppressed from locally acting on the connection portions 14 and 15.

The flat portion 13 is positioned at a middle portion between the crests 11 and the valleys 12 in the annular body 10 in the axial direction. In this case, in a case where the annular body 10 is pressed by the biasing target and compressed in the axial direction, the joined portion 16 is less likely to come into contact with the biasing target until immediately before the entire wave spring becomes flat. Accordingly, it is possible to suppress a load from being applied to the joined portion 16 from the biasing target and to suppress the failure of the joined portion 16. In the present embodiment, the flat portion 13 is positioned at a central portion of the annular body 10 in the axial direction, and thus the above action effects can be more surely achieved.

Second Embodiment

A second embodiment according to the present invention will be described, but basic configuration thereof is the same as that of the first embodiment. Therefore, the same components will be denoted by the same reference signs as in the first embodiment and the description thereof will be omitted, and only different points will be described.

Figure 3:
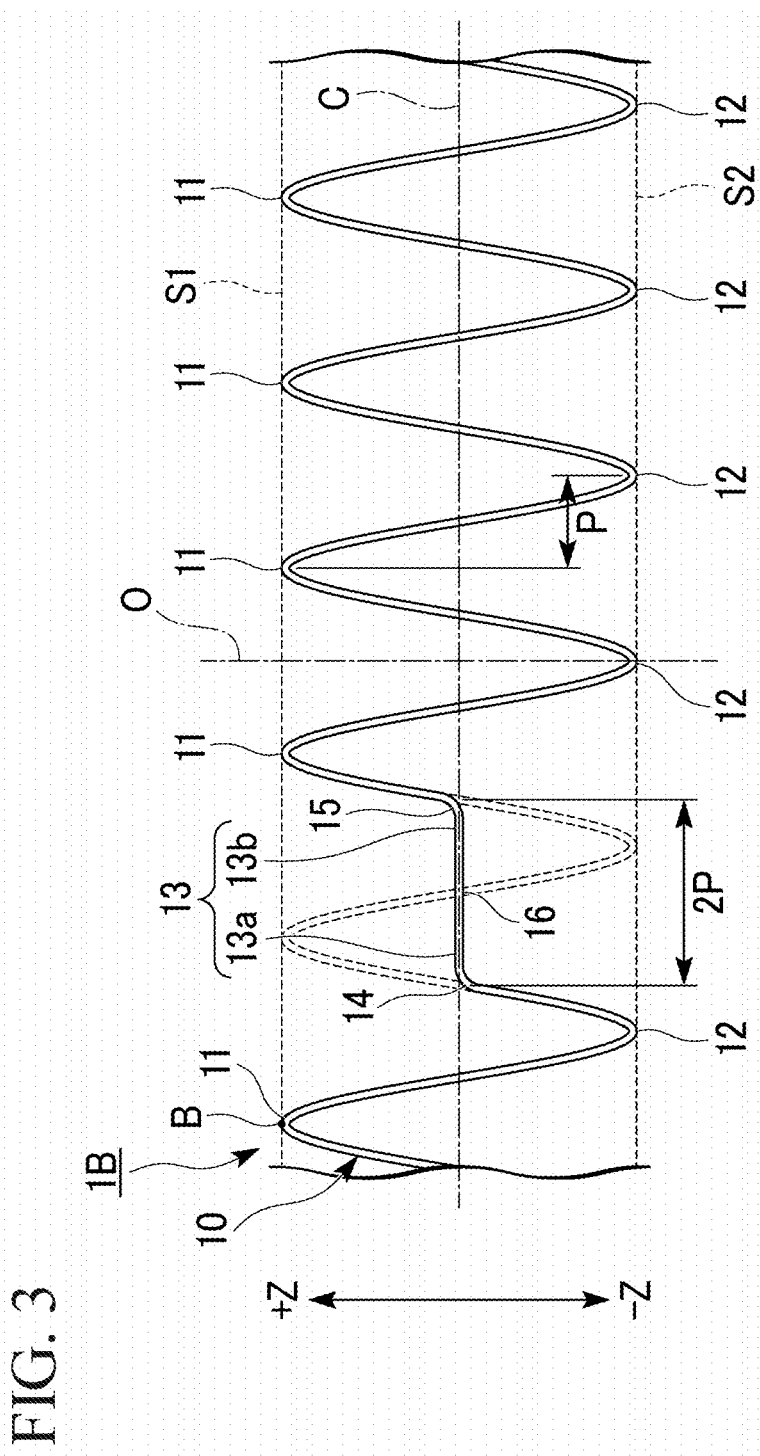
FIG. 3 is an expanded schematic view of a wave spring according to a second embodiment.

FIG. 3 is an expanded schematic view of a wave spring 1B according to a second embodiment. As shown in FIG. 3, in the present embodiment, the flat portion 13 is interposed with the crest 11 and the valley 12 in the circumferential direction. Stated another way, the crest 11, the flat portion 13, and the valley 12 are continuous in this order in the circumferential direction.

The first connection portion 14 connecting the flat portion 13 and the valley 12 is formed in a curved surface shape protruding toward the +Z side, and the second connection portion 15 connecting the flat portion 13 and the crest 11 is formed in a curved surface shape protruding toward the −Z side. In a word, the first connection portion 14 and the second connection portion 15 which are both ends of the flat portion 13 in the circumferential direction are formed in a curved surface shape protruding in the axial direction.

In the present embodiment, a length of the flat portion 13 in the circumferential direction is about twice a length of the pitch P. Therefore, the wave spring 1B according to the present embodiment has a shape in which a pair of crest and valley (a broken line portion in FIG. 3), in a case where the crests 11 and the valleys 12 are arranged at the same pitch without forming the flat portion 13, is replaced with the flat portion 13.

Here, the shape in the first embodiment is compared with the shape in the second embodiment. The wave spring 1A according to the first embodiment has a shape in which one crest indicated by a broken line in FIG. 2 is replaced with the flat portion 13. On the other hand, the wave spring 1B according to the second embodiment has a shape in which a pair of crest and valley indicated by a broken line in FIG. 3 is replaced with the flat portion 13. As described above, more valleys 12 can be arranged in the wave spring 1A according to the first embodiment as compared with the wave spring 1B according to the second embodiment, and thus the wave spring 1A has a shape likely to secure the biasing force. Accordingly, there is a relatively large degree of freedom in selecting specifications that affect the biasing force, such as a thickness of the spring material or a dimension of the pitch P. On the other hand, a length of the flat portion 13 in the circumferential direction is large in the wave spring 1B according to the second embodiment as compared with the wave spring 1A according to the first embodiment. Accordingly, a relative position of both ends 13a and 13b in a case of joining can be more easily adjusted, and joining accuracy can be further stabilized.

EXAMPLES

As Example 1, a stress distribution in the wave spring 1A when the annular body 10 is elastically deformed to be flat was calculated by simulation for the wave spring 1A according to the first embodiment. As a result, a stress value was maximum at the top of the valley 12 (a point A in FIG. 2) adjacent to the flat portion 13. On the other hand, a stress value at the central portion of the flat portion 13 (the joined portion 16) was 0.25 times the stress value at the point A.

As Example 2, a stress distribution in the wave spring 1B when the annular body 10 is elastically deformed to be flat was calculated by simulation for the wave spring 1B according to the second embodiment. As a result, a stress value was maximum at the top of the crest 11 (a point B in FIG. 3) adjacent to the flat portion 13 with the valley 12 interposed therebetween. On the other hand, a stress value at the central portion (the joined portion 16) of the flat portion 13 was 0.03 times the stress value at the point B.

It was confirmed that stress is unlikely to concentrate on the joined portion 16 in any of the shapes in the first embodiment and the second embodiment from the results of Examples 1 and 2.

It was confirmed that stress is likely to concentrate on the crest 11 or the valley 12 from the results of the simulations. Therefore, stress is suppressed from concentrating on the joined portion 16 by arranging the joined portion 16 at the middle portion between the crest 11 and the valley 12 without arranging the joined portion 16 at the crests 11 or the valleys 12. Thus, the stress concentration on the joined portion 16 is suppressed, thereby capable of improving the strength of the wave springs 1A and 1B.

The technical scope of the present invention is not limited to the above embodiments, and various modifications can be made without departing from the scope of the present invention.

For example, the wave springs 1A and 1B may have claws protruding radially inward or radially outward from the annular body 10. In this case, the rotation of the wave springs 1A and 1B around the center axis O can be restricted by the claws.

Although the pitches P are fixed throughout the annular body 10 in the above embodiments, the pitches P may be non-fixed. For example, a pitch of a portion in the annular body 10 which is positioned near the flat portion 13 may be set to be smaller than a pitch of a portion positioned far from the flat portion 13. In this case, it is possible to compensate for a decrease in the biasing force due to the replacement of the shape indicated by a broken line in FIG. 2 or FIG. 3 with the flat portion 13 and to apply the biasing force to the biasing target in a well-balanced manner.

The components in the above-described embodiments may be replaced with known components without departing from the scope of the present invention.

REFERENCE SIGNS LIST 1A, 1B: wave spring
10: annular body
11: crests
12: valleys
13: flat portion
14: first connection portion 15: second connection portion
16: joined portion
O: center axis

What is claimed is:

1. A wave spring comprising:
an annular body in which crests and valleys are alternately and continuously formed in a circumferential direction,
wherein the crests protrude toward one side in an axial direction along a center axis of the annular body,
the valleys protrude toward the other side in the axial direction,
at least a portion of the annular body in the circumferential direction is a joined portion formed from a first end and a second end of the annular body welded to be integrated,
the annular body is formed in a continuous ring shape in the entire circumferential direction with a formation of the joined portion,
the joined portion of the annular body is formed in a flat portion extending in a plane orthogonal to the center axis of the annular body,
the flat portion is positioned between the crests and the valleys in the axial direction along the center axis,
the crests and the valleys are arranged at pitches in the circumferential direction, a pitch of the pitches being an interval in the circumferential direction between an end of a crest of the crests on the one side in the axial direction and an end of a valley of the valleys adjacent to the crest on the other side in the axial direction, and
the pitches at which the crests and the valleys not adjacent to the flat portion are arranged are fixed and different from the pitches at which the crests and the valleys adjacent to the flat portion are arranged.

2. The wave spring according to claim 1,
wherein both ends of the flat portion in the circumferential direction are formed in curved surface shapes protruding in the axial direction of the center axis.

3. The wave spring according to claim 1,
wherein the flat portion is positioned at a central portion of the annular body in the axial direction.

4. The wave spring according to claim 1,
wherein two crests of the crests or two valleys of the valleys are continuous to both ends of the flat portion in the circumferential direction.

5. The wave spring according to claim 1, wherein a crest of the crests, the flat portion, and a valley of the valleys are continuous in this order in the circumferential direction.

6. The wave spring according to claim 1,
wherein the flat portion is provided in place of one crest of the crests and one valley of the valleys adjacent to the one crest, or in place of the one crest or the one valley.

7. A wave spring comprising:
an annular body in which crests and valleys are alternately and continuously formed in a circumferential direction,
wherein the crests protrude toward one side in an axial direction along a center axis of the annular body,
the valleys protrude toward the other side in the axial direction,
at least a portion of the annular body in the circumferential direction is a joined portion formed from a first end and a second end of the annular body welded to be integrated,
the annular body is formed in a continuous ring shape in the entire circumferential direction with a formation of the joined portion,
the joined portion of the annular body is formed in a flat portion extending in a plane orthogonal to the center axis of the annular body,
the flat portion is positioned between the crests and the valleys in the axial direction along the center axis,
intervals in the axial direction between ends of the crests on the one side in the axial direction and ends of the valleys on the other side in the axial direction are fixed, and
pitches at which the crests and the valleys are arranged in the circumferential direction are non-fixed, a pitch of the pitches being an interval in the circumferential direction between an end of a crest of the crests on the one side in the axial direction and an end of a valley of the valleys adjacent to the crest on the other side in the axial direction.

* * * * *